Dec. 13, 1960  R. J. EHRET  2,964,693
CURRENT REGULATOR
Filed Aug. 17, 1955
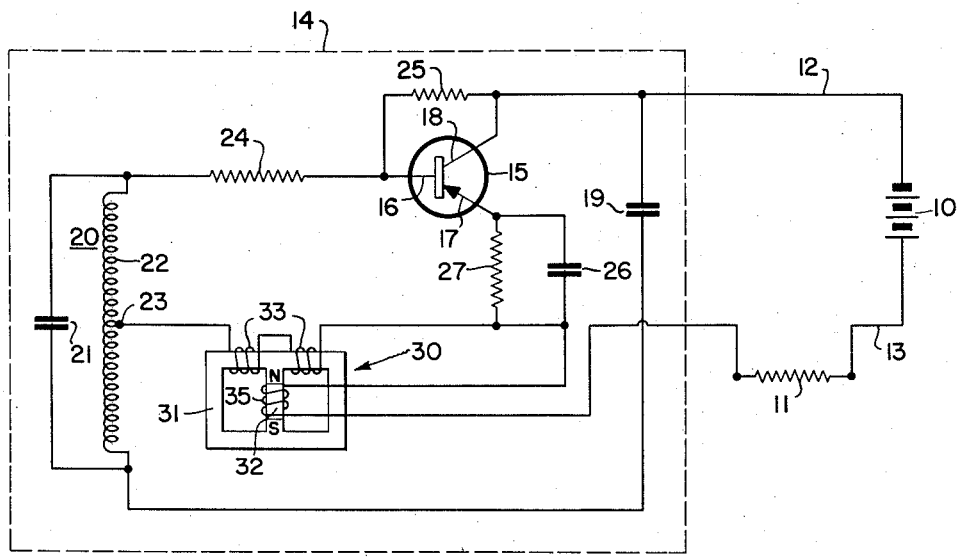
INVENTOR.
ROBERT J. EHRET
BY *Henry L. Hanson*
ATTORNEY.

United States Patent Office 2,964,693
Patented Dec. 13, 1960

2,964,693

CURRENT REGULATOR

Robert J. Ehret, Palo Alto, Calif., assignor to Minneapolis-Honeywell Regulator Company, Minneapolis, Minn., a corporation of Delaware Filed Aug. 17, 1955, Ser. No. 528,926

5 Claims. (Cl. 323—4)

A general object of the present invention is to provide an improved apparatus useful as a current regulator, particularly in direct current circuits. More specifically, the present invention is concerned with a highly sensitive current regulator of the type which may be connected directly in series with one lead of a power supply circuit to maintain a high degree of current regulation in the circuit.

Line current regulators have been required and used in many types of electrical circuits to maintain a desirable degree of current flow constancy in the electrical circuit associated therewith. The simplest of these current regulators have taken the form of high magnitude resistors connected in series with the associated power source to maintain a reasonably constant current flow in the circuit notwithstanding changes in the load impedance. Another form of current regulator adapted for direct line connection is the ballast resistor. This resistor like other types of line regulating elements is useful only under conditions where accurate regulation is not required. The present invention is directed to a form of electric regulator which is adapted for connection in series with a power line with the regulator providing a degree of accuracy which is considerably higher than that obtainable with the aforementioned resistance type current regulators.

The improved accuracy and sensitivity of the present current regulator is achieved by the use of a regulating oscillator the constancy of regulation of which is dependent upon the constancy of a permanent magnetic standard. As present day permanent magnets may be formed with a degree of constancy of a very high order, the current regulation which may be achieved by a circuit of the present type may be maintained with the same high degree of constancy.

It is therefore a more specific object of the present invention to provide a current regulator comprising an electrical oscillator having as a standard a permanent magnet for regulating the oscillation intensity and thereby the current regulating effects of the oscillator circuit.

Another more specific object of the present invention is to provide an improved oscillator which may be operated directly from the current flowing in a single power lead with the oscillator regulation being determined by a magnetic standard which is a part of an electrical impedance element which regulates the intensity of the oscillations of the oscillator circuit and thereby its current regulating effects.

Still another more specific object of the present invention is to provide an improved transistor oscillator circuit useful for regulating a current flow in a power line where the oscillator circuit is powered by the current flowing in the line and the current flowing in the line is compared with a magnetic standard to effect a regulation of the oscillation intensity of a transistor oscillator.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described preferred embodiments of the invention.

Referring to the single figure, the numeral 10 represents a power source, shown in the drawing as a battery. This power source is adapted to supply power to a load impedance 11 by way of leads 12 and 13 as well as by way of a current regulating means 14 which forms the basic element of the present invention. It is the function of the regulator 14 to maintain the current flowing through the load impedance 11 constant regardless of the changes in the magnitude of that load impedance.

The current regulator 14 comprises an oscillator circuit having a transistor 15 as the amplifying means of the oscillator. The transistor 15 includes a base electrode 16, an emitter electrode 17, and a collector electrode 18. The output of the oscillator transistor 15 is coupled by way of a condenser 19 to a resonant tank circuit 20 formed by connecting a condenser 21 in parallel with a tapped inductance element 22, the latter of which is tapped at 23. The resonant tank circuit 20 is connected at its upper terminal by means of a resistor 24 to the base 16 of the transistor 15. In shunt between the collector 18 and the base 16 is a further bias resistor 25.

Connected to the emitter 17 is a condenser 26 and a resistor 27 which are connected in parallel to provide a desired biasing effect for the emitter of the transistor 15.

For regulating the feedback in the oscillator circuit, there is provided a variable inductance element 30 which takes the form of a saturable core element 31 having a permanent magnet 32 connected in the center leg thereof to establish a predetermined flux bias on the core 31. A pair of coils 33 are wound on the core 31 and the inductance of these coils connected in series will be variable in accordance with the degree of saturation in the core 31. A feedback coil 35 is wound on the center leg of the core 31 so as to oppose the flux produced by the permanent magnet 32.

In considering the operation of the present current regulator, it should first be understood that the regulator 14 is to maintain a constant current flowing from the power source 10 to the load 11, even though the impedance of the load 11 may change. The current regulator 14 functions as a variable resistance in series with the leads 12 and 13 and the load 11. The variations in the regulator resistance, looking into the regulator 14 with changes in the load resistance, will result in a constant current flowing through the load 11.

The heart of the regulator 14 is the electrical oscillator which is made to oscillate with an intensity which varies in accordance with the changes in magnitude of the current flowing through the load impedance 11. These changes may result from load impedance changes, supply voltage changes, and the like. The alternating current signal circuits for the oscillator may be traced from the collector 18 through condenser 19, the lower portion of the coil 22 to tap 23, coils 33, and condenser 26 to the emitter 17 of the transistor 15. The signal flowing through the lower portion of the coil 22 will induce a voltage in the entire coil so that there will be a voltage applied across the resonant circuit 20. The voltage on the resonant circuit 20 is coupled regeneratively through the resistor 24 to the base 16 so that the circuit will remain in an oscillating state. The direct current circuit for the transistor 15 may be traced from the lower terminal of the source 10 through lead 13, load 11, coil 35, resistor 27, emitter 17, collector 18, and lead 12 back to the upper terminal of the source 10. The resistors 24 and 25 are present in the circuit primarily for oscillation initiation purposes and provide a suitable bias on the base 16 relative to the emitter 17 to insure that the circuit may be self-excited into oscillation under low ambient temperature conditions. The current flowing in this biasing circuit is insignificant compared to the current flowing in the emitter-collector circuit.

When the circuit is in oscillation, the intensity of the oscillations are an inverse function of the impedance of the coils 33 on the emitter of the transistor 15. As the impedance of the coils 33 increases, the oscillation intensity will decrease and there will be a resultant decrease in the current flowing from the power source 10. Conversely, if the impedance of the coils 33 decreases, the intensity of the oscillations of the oscillator will increase and there will be a resultant increase in the current flowing from the power source 10.

In order to effect a desired current regulating effect on the output current, the core 31 has a fixed bias applied thereto by the permanent magnet 32. This fixed bias by itself tends to maintain the impedance of the coils 33 at a predetermined value. In the absence of any feedback direct current from the coil 35, the coil 33 would have a substantially constant impedance which would be independent of load impedance changes. By connecting the feedback coil 35 so as to oppose the flux produced by the permanent magnet 32, it is possible to vary the impedance of the coils 33 in accordance with the current demands of the load 11. The coil 35 is wound to produce a flux to oppose the permanent magnet flux. The effect of the feedback coil opposing the bias flux of the permanent magnet is to reestablish the magnitude of the impedance 33 at a value consistent with the load impedance. Assuming a fixed magnitude of load impedance at 11, the impedance level of the coils 33 will remain constant and there will be a predetermined current flowing through the load 11.

If the impedance of the load 11 should decrease, there will be a tendency for the current flowing from the power source 10 to increase. This increase in current flow will be sensed by the coil 35 and it will produce on the core 31 an increased biasing flux in the core 31. The increased bias on the core 31 will cause the impedance of the coils 33 to increase and therefore the intensity of the oscillations of the oscillator will decrease. With decreased intensity of the oscillations of the oscillator, there will be a decrease in the current flowing through the regulator and the load 11 and the magnitude of the current flow will tend to stabilize out at a value which will establish a balance of fluxes between the flux 35 and the permanent magnet 32 in the core 31.

If the impedance of the load 11 should increase, there will be a tendency for the current flowing from the power source to the load to decrease. The decrease in current through the load 11 will result in the flux bias on the core 31 from the coil 35 being decreased and there will be a consequent reduction in the impedance of the coils 33. The decrease in the impedance of the coils 33 will produce oscillations in the circuit of greater intensity. This will mean that there will be a tendency for a greater current to flow through the regulator 14 and through the load 11. The current flow will stabilize out at a value which the flux from the coil 35 will substantially balance the flux from the permanent magnet 32.

As this collector detector and regulator is extremely sensitive to changes in the impedance of coils 33, the degree of regulation will be correspondingly very high and accurate.

From the foregoing it will be readily apparent that there has been provided an improved highly sensitive current regulator which is adapted for direct connection in series with a power line for regulating the current to a load circuit. While the circuit has been shown as useful in a direct current circuit, it will be readily apparent that the circuit may be adapted to an alternating current circuit by the use of rectifier means in the regulator feedback circuit.

While, in accordance with the provisions of the statutes, there has been illustrated and described the best forms of the embodiments of the invention known, it will be apparent to those skilled in the art that changes may be made in the forms of the apparatus disclosed without departing from the spirit of the invention as set forth in the appended claims and that in some cases, certain features of the invention may be used to advantage without a corresponding use of other features.

Having now described the invention, what is claimed as new and for which it is desired to secure Letters Patent is:

1. An electrical constant current source comprising a power source, an electrical oscillator connected to said source and whose oscillation intensity and output current determines the current flowing from said source, and a saturable impedance connected to said oscillator to regulate the oscillation intensity thereof, said impedance having a control saturating winding connected to said oscillator to be energized by the output current thereof, and a permanent magnet positioned to supply a fixed bias to said saturable impedance so that the current flow from said power source will remain substantially constant.

2. A constant current regulator comprising a transistor amplifying device having an input and an output, said output being regeneratively coupled to said input to form an oscillator, a source of power having two terminals, a load circuit arranged for connection in a series circuit with said oscillator to the two terminals of said source of power, and a saturable impedance having a constant magnetic bias and a control means operative in response to the output current in said series circuit, said impedance being connected to the input circuit of said transistor to regulate the output thereof in accordance with the current flowing from said power source.

3. A constant current regulator adapted for connection in series with one lead of a two wire circuit connecting a power source to a load circuit comprising an electrical current regulator powered solely by the current flowing in the one lead, said regulator comprising an electrical oscillator of the transistor type having a regenerative feedback connection, and a feedback regulating element connected to said feedback connection and comprising a fixed biased saturable core member having a bias control winding connected in series with said one lead.

4. Apparatus as defined in claim 3 wherein the transistor of said oscillator has an emitter-collector circuit connected in series with said bias control winding.

5. A constant current regulator adapted for connection in series with one lead of a two wire circuit connecting a power source to a load circuit comprising an electrical current regulator powered solely by the current flowing in the one lead, said regulator comprising an electrical oscillator having an input and a regenerative feedback circuit, and a feedback regulating element comprising a saturable reactor having a permanent magnet bias on the core thereof and an opposing bias produced by a coil in series with said one lead, said element being connected to be responsive to the current flowing in said one lead.

References Cited in the file of this patent

UNITED STATES PATENTS

| 1,788,152 | Dowling | Jan. 6, 1931 |
| 2,146,761 | Philpott | Feb. 14, 1939 |
| 2,441,967 | Haug | May 25, 1948 |
| 2,661,425 | Mittelmann | Dec. 1, 1953 |
| 2,693,568 | Chase | Nov. 2, 1954 |
| 2,716,729 | Shockley | Aug. 30, 1955 |
| 2,772,370 | Bruce et al. | Nov. 27, 1956 |